United States Patent
Spiessl et al.

(10) Patent No.: US 9,823,735 B2
(45) Date of Patent: Nov. 21, 2017

(54) METHOD FOR SELECTING AN INFORMATION SOURCE FROM A PLURALITY OF INFORMATION SOURCES FOR DISPLAY ON A DISPLAY OF SMART GLASSES

(71) Applicant: Bayerische Motoren Werke Aktiengesellschaft, Munich (DE)

(72) Inventors: Wolfgang Spiessl, Pfaffenhofen (DE); Felix Klanner, Singapore (SG); Martin Enders, Deisenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 59 days.

(21) Appl. No.: 14/885,872

(22) Filed: Oct. 16, 2015

(65) Prior Publication Data

US 2016/0041612 A1     Feb. 11, 2016

Related U.S. Application Data

(63) Continuation of application No. PCT/EP2014/057541, filed on Apr. 14, 2014.

(30) Foreign Application Priority Data

Apr. 19, 2013    (DE) ..................... 10 2013 207 063

(51) Int. Cl.
*G09G 5/00* (2006.01)
*G06F 3/00* (2006.01)
(Continued)

(52) U.S. Cl.
CPC ......... *G06F 3/005* (2013.01); *G02B 27/0172* (2013.01); *G06F 3/0346* (2013.01);
(Continued)

(58) Field of Classification Search
CPC ........ G06F 3/0346; G06F 3/005; G06F 3/012; G06F 3/013; G06F 3/015; G02B 27/0172;
(Continued)

(56) References Cited

U.S. PATENT DOCUMENTS

| 4,873,994 A | 10/1989 | Anger et al. |
| 5,003,300 A | 3/1991 | Wells |

(Continued)

FOREIGN PATENT DOCUMENTS

| CA | 2 388 766 A1 | 12/2003 |
| DE | 36 10 897 A1 | 10/1987 |

(Continued)

OTHER PUBLICATIONS

PCT/EP2014/057542, International Search Report dated Jul. 22, 2014 (Three (3) pages).

(Continued)

*Primary Examiner* — Vijay Shankar
(74) *Attorney, Agent, or Firm* — Crowell & Moring LLP

(57) ABSTRACT

A method for determining an information source from a plurality of information sources for display on smart glasses is disclosed In one embodiment, the method includes determining a spatial orientation of the smart glasses, determining from a plurality of criteria, which are respectively related to the spatial orientation of the smart glasses, a criterion which is fulfilled by the determined spatial orientation of the smart glasses, assigning each of the plurality of criteria an information source from the plurality of information sources, and selecting the information source assigned to the determined criterion.

15 Claims, 2 Drawing Sheets

(51) Int. Cl.
*G06F 3/0346* (2013.01)
*G02B 27/01* (2006.01)

(52) U.S. Cl.
CPC ............. *G02B 2027/014* (2013.01); *G02B 2027/0138* (2013.01); *G02B 2027/0141* (2013.01); *G02B 2027/0178* (2013.01)

(58) Field of Classification Search
CPC .... G02B 2027/0138; G02B 2027/0141; G02B 2027/0178; G02B 2027/014
USPC .......................................... 345/4–9, 156–160
See application file for complete search history.

(56) References Cited

U.S. PATENT DOCUMENTS

| | | | |
|---|---|---|---|
| 5,642,221 | A | 6/1997 | Fischer et al. |
| 5,786,849 | A | 7/1998 | Lynde |
| 7,643,737 | B2 | 1/2010 | Kimata et al. |
| 8,184,067 | B1 | 5/2012 | Braun et al. |
| 8,223,024 | B1 | 7/2012 | Petrou |
| 8,601,380 | B2 * | 12/2013 | Vaittinen ............ G06F 3/04815 345/156 |
| 8,638,223 | B2 * | 1/2014 | Lahcanski ............... G06F 3/011 340/539.11 |
| 2001/0030630 | A1 | 10/2001 | Junk |
| 2002/0044152 | A1 | 4/2002 | Abbott, III et al. |
| 2010/0091377 | A1 | 4/2010 | Hedges et al. |
| 2011/0080289 | A1 | 4/2011 | Minton |
| 2011/0282130 | A1 | 11/2011 | Krueger |
| 2012/0240077 | A1 | 9/2012 | Vaittinen et al. |
| 2012/0293325 | A1 | 11/2012 | Lahcanski et al. |
| 2013/0038510 | A1 | 2/2013 | Brin et al. |
| 2014/0292642 | A1 | 10/2014 | Schubert et al. |

FOREIGN PATENT DOCUMENTS

| | | |
|---|---|---|
| DE | 198 02 220 A1 | 7/1999 |
| DE | 100 13 478 A1 | 9/2001 |
| DE | 100 18 490 A1 | 11/2001 |
| DE | 10 2004 061 8 | 7/2005 |
| DE | 10 2005 039 7 | 3/2007 |
| DE | 10 2006 004 7 | 8/2007 |
| DE | 10 2007 013 9 | 11/2007 |
| DE | 10 2011 104 5 | 12/2012 |
| EP | 1 182 541 A2 | 2/2002 |
| EP | 1 586 861 A1 | 10/2005 |
| WO | WO 2012/011893 A1 | 1/2012 |

OTHER PUBLICATIONS

German Search Report issued in counterpart DE 10 2013 207 064.0 dated Feb. 28, 2014 with Statement of Relevancy (Five (5) pages).
PCT/EP2014/057541, International Search Report dated Jul. 22, 2014 (Three (3) pages).
German Search Report issued in counterpart DE 10 2013 207 063.2 dated Feb. 17, 2014 with Statement of Relevancy (Five (5) pages).
European Office Action issued in European counterpart application No. 14 716 871.0—1972 dated Jun. 8, 2017 (Eight (8) pages).
Greg Welch et al.: "Motion Tracking: No Silver Bullet, but a Respectable Arsenal", IEEE Computer Graphics and Applications, Dec. 31 , 2002, pp. 24-38, XP055373333, URL: http://www.cise.ufl.edu/research/lok/teaching/ve-s09/papers/cga02 welch tracking.pdf.

\* cited by examiner

METHOD FOR SELECTING AN INFORMATION SOURCE FROM A PLURALITY OF INFORMATION SOURCES FOR DISPLAY ON A DISPLAY OF SMART GLASSES

CROSS REFERENCE TO RELATED APPLICATIONS

This application is a continuation of PCT International Application No. PCT/EP2014/057541, filed Apr. 14, 2014, which claims priority under 35 U.S.C. §119 from German Patent Application No. 10 2013 207 063.2, filed Apr. 19, 2013, the entire disclosures of which are herein expressly incorporated by reference.

BACKGROUND AND SUMMARY OF THE INVENTION

The invention relates to a method for selecting an information source from a plurality of information sources for display on a display of smart glasses, a corresponding device and a corresponding computer program.

Nowadays, smart glasses, sometimes also called head-mounted displays, comprising a display are known. Smart glasses are worn on the head by a user in a way similar to conventional spectacles which are used as a visual aid. The display of the smart glasses is located in this case in the field of view of the wearer. Some smart glasses comprise a display only for one eye, other smart glasses comprise two partial displays, each eye being assigned a partial display.

It is known, furthermore, that smart glasses can comprise a semitransparent display. Such a display enables the wearer to recognize both displayed information and the surroundings behind the display. This type of display is particularly well suited to the contact-analog display of information. In contact-analog display, the information to be displayed is assigned a location in the surroundings of the wearer, and the information is displayed in a fashion assigned to said location, sometimes also being designated as a positionally correct display. This can be performed by seemingly superimposing the information for the wearer over the assigned location, or by displaying the information in the spatial vicinity of the assigned location, if appropriate with a symbol such as a line, in order indicate the assigned location. The information itself can likewise be a symbol, an image, text or the like. The contact-analog display is sometimes also termed augmented reality.

Smart glasses whose display does not lie in the central field of view of the wearer have become known. The field of view and the central field of view are defined by the angular range in which people can typically perceive objects in their surroundings. The angular range is determined starting from the central sightline when looking straight ahead (the central position of the pupils with reference to the eye sockets). The central field of view lies within an angular range of 10°, 15°, 20° or 25° from the central sightline when looking straight ahead. Consequently, objects of the surroundings lie in the central field of view only when they are located within a conical space of the surroundings around the central sightline when looking straight ahead. The field of view which does not lie in the central field of view is termed peripheral field of view.

By comparison with smart glasses with a display in the central field of view, smart glasses whose display does not lie in the central field of view of the wearer are less suited for contact-analog display of information. The reason for this is that when a person is performing an activity his attention and perception of his surroundings are more readily directed to the central field of view. However, smart glasses whose displays do not lie in the central field of view of the wearer offer the possibility, in particular, of providing abstract additional information to the wearer of the spectacles, such as the time of day or the date.

An object on which the invention is based is to improve the display of information by smart glasses, in particular for smart glasses whose display does not lie in the central field of view of the wearer.

This object may be achieved by the subject matter of the independent claims. Advantageous developments are defined in the dependent claims.

In one aspect, a method for determining an information source from a plurality of information sources for display on smart glasses comprises: determining the spatial orientation of the smart glasses; determining from a plurality of criteria a criterion which is fulfilled by the determined spatial orientation of the smart glasses, the criterion respectively being related to the spatial orientation of the smart glasses; each criterion being assigned an information source; selecting the information source which is assigned to the determined criterion.

This enables the wearer of the smart glasses to be presented with different information items as a function of the particular orientation of the smart glasses. Different information sources in this case supply different information, in particular different types of information, that is to say, for example, abstract variables such as the speed of a vehicle or the video image of a camera.

It frequently happens that different orientations of a person's head are associated with different activities. For example, at a typical office workplace an orientation of the head with respect to the display of a PC will be related to the person's processing of the work tasks. If the person is addressed by a colleague, the orientation of the head will change to the direction of the colleague who, in most cases, will not be located in the direction of the display of the PC. Should said person be wearing smart glasses, the spatial orientation of the smart glasses will change in accordance with the head movement of the person. This is utilized to select relevant information sources for the respective activity and display them to the person on the smart glasses. For example, the time of day can be faded in in the event of the PC display being viewed. If the person then turns his head away from the display, should there be an incoming email on the PC or an outstanding deadline it is possible to display an alert on the smart glasses which otherwise appears on the PC display and could be overlooked. In this way, the spectacle wearer is always provided with the relevant information item through the selection of the information source.

A further field of application for the method according to the invention is when driving a vehicle. Here, as well, different orientations of the head are frequently associated with different activities. When the surroundings of the vehicle, in particular the surroundings lying in front, are being viewed the head is frequently in a virtually horizontal orientation. If the driver, by contrast, is operating a function of the vehicle such as a radio or air conditioning in the dashboard, the head of the driver is frequently inclined downward. It is then possible to select, for the different orientations of the head which are associated with the different activities of the driver, information which supports the driver's activity. For example, when the driver is viewing the surroundings and holds his head in a virtually horizontal orientation, the time of day or the distance remaining to a destination can be displayed. If the driver inclines his head downward toward operating elements of the vehicle, the video recording of a front camera can be displayed by the display of the smart glasses. In this way, the driver can at least partially attend to his task of heeding the surroundings even when his view is directed into the interior of the vehicle.

Alternatively or in addition, when the driver is looking into the interior it is possible to output on the display of the smart glasses warnings by driver assist systems which have detected the danger of a collision.

The proposed method is advantageous, in particular, when the wearer of the smart glasses uses same in accordance with the typical, accepted or intended of wearing the spectacles. The plurality of information sources and the plurality of criteria can consist of two, three or more elements. One of the criteria of the plurality of criteria can be an absorption criterion which is always fulfilled when no other one of the criteria from the plurality of criteria is fulfilled.

When determining the spatial orientation, it is not mandatory to determine the complete spatial orientation in all three dimensions of space—it can likewise suffice, for example, to determine the inclination of the smart glasses relative to a horizontal.

In one development, one of the criteria from the plurality of criteria defines that the orientation of the smart glasses is such that, assuming the smart glasses are worn as intended and that they are in a vehicle, the wearer of the spectacles views the surroundings of the vehicle. Alternatively or in addition, a criterion can define that the orientation of the smart glasses is such that, assuming the smart glasses are worn as intended and that they are in a vehicle, the wearer of the spectacles perceives other traffic users, detected by a driver assist system, associated with the risk of a collision.

In another development, a criterion from the plurality of criteria specifies a range of directions; the smart glasses being assigned a direction; the method further comprising: determining the direction assigned to the smart glasses with the aid of the determined spatial orientation of the smart glasses. A range of directions is one which can, for example, be defined by specifying the angular ranges in a fashion emanating from the head of the wearer. The ranges of direction can be defined in accordance with the geometry between windows of the vehicle and the position of the head of the wearer. A range of directions can also be prescribed by a driver assist system which has detected the risk of a collision with another road user or object and has determined for the purpose of avoiding the collision a range of directions to which the driver should turn his view to detect the risk. A range of directions can also be only a stipulation of a range for the horizontal or vertical components of the assigned direction. The range of directions can take account of the settings of the seat of the wearer of the smart glasses, since said settings alter the position of the head and therefore also the range of directions, which represents a viewing of the surroundings.

In another development, the smart glasses include a camera and the determination of the spatial orientation comprises the following: receiving a photograph of the camera; recognizing the image of a portion of the interior of the vehicle in the photograph; determining the position of the image in the photograph; determining the spatial orientation of the smart glasses with the aid of the determined position of the image in the photograph. In this development, the orientation of the smart glasses is therefore obtained by evaluation of a camera photograph. This development is advantageous precisely in known surroundings such as in an interior of a vehicle. The reason is that the interior view of the vehicle is well known down to small changes owing to objects brought into the vehicle. With the aid of image processing of photographs of the camera, said knowledge can advantageously be used to determine the orientation of the smart glasses easily and accurately. Such processing methods are known in the prior art.

The recognition of the image of a portion of the interior of the vehicle in the photograph can in this case comprise: recognizing structures in the photograph; comparing the recognized structures in the photograph with stored structures of the interior of the vehicle. A structure can be formed, in particular, by the transition to windows, or by operating elements.

In a further variant, the smart glasses can, alternatively or in addition, include position sensors which are set up to detect the spatial position of the smart glasses, the determination of the spatial orientation of the smart glasses inside a vehicle then being performed with the aid of the position sensors.

In a preferred development, the plurality of information sources comprises: a video camera which is directed in the driving direction of the vehicle, or in any other direction, for example to the side of the vehicle or upward, in order to view the sky, and an information processing means which is set up to output abstract information, in particular physical measured values, of the state of the vehicle, in particular the speed of the vehicle, the rotational speed of a drive of the vehicle, the power output of the drive of the vehicle, or the filling condition of the energy store of the vehicle. It is possible to provide a plurality of video cameras between which the driver or user can switch, for example using a control surface on the smart glasses.

In one embodiment, the display of the smart glasses provides a display only for one eye of the wearer of the smart glasses. The display of the smart glasses can in this case cover less than a third or a quarter of the field of view of the eye and not cover the central field of view.

In another aspect, a device comprises: means for determining the spatial orientation of the device; electronic processing means; the device being set up to execute one of the above methods. The electronic processing means can be a computer, dedicated circuits or a microcontroller. The means for determining the spatial orientation of the device can be position sensors, or a camera in the smart glasses, and the electronic processing means, which are set up with programming technology to determine the spatial orientation. As described above, said determination of the spatial orientation can be based on the known structure of the interior of the vehicle. The device can comprise interfaces with the information sources from the plurality of information sources. Said interfaces can be hard-wired or wireless and include suitable protocols for data exchange. Such interfaces and protocols are known in the prior art.

In another aspect, a computer program comprises instructions for executing one of the above methods. The computer program can prompt a computer to execute the method when it executes the instructions.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements across the figures.

DETAILED DESCRIPTION OF THE DRAWINGS

Figure 1:
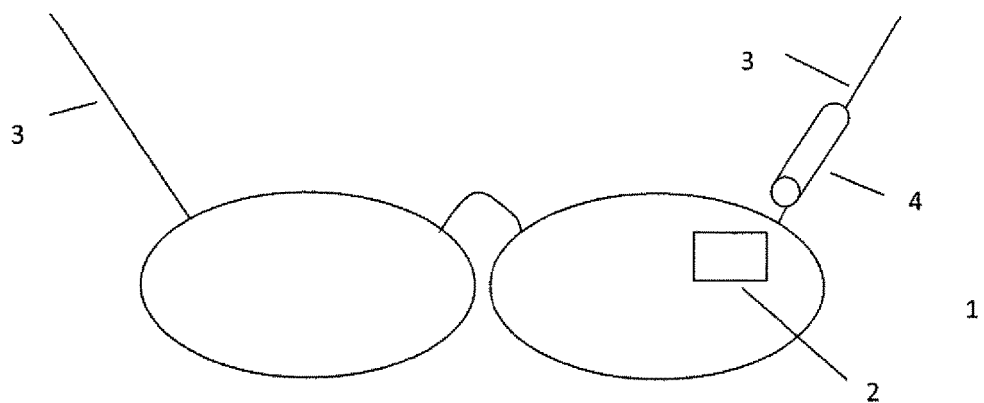
FIG. 1 is a schematic of smart glasses with a semitransparent display in a peripheral field of view in accordance with an exemplary embodiment.

FIG. 1 is a schematic of smart glasses 1 with a semitransparent display 2 in a peripheral field of view in accordance with an exemplary embodiment. The smart glasses 1 further comprise two legs 3 and a camera 4 which is mounted on one of the legs. When the smart glasses 1 are worn as intended the shooting direction of the camera corresponds to the central sightline of the wearer. The camera 4 can also include electronic signal processing means for the purpose of image processing. When worn as intended, the legs 3 of the smart glasses 1 lie on the ears 5 of the wearer, as shown in FIG. 2a.

Figure 2A:
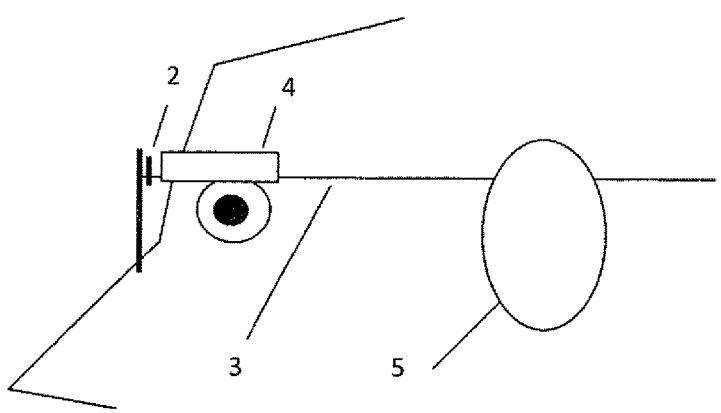
FIG. 2a is a schematic of the smart glasses in a first orientation in accordance with the exemplary embodiment.
Figure 2B:
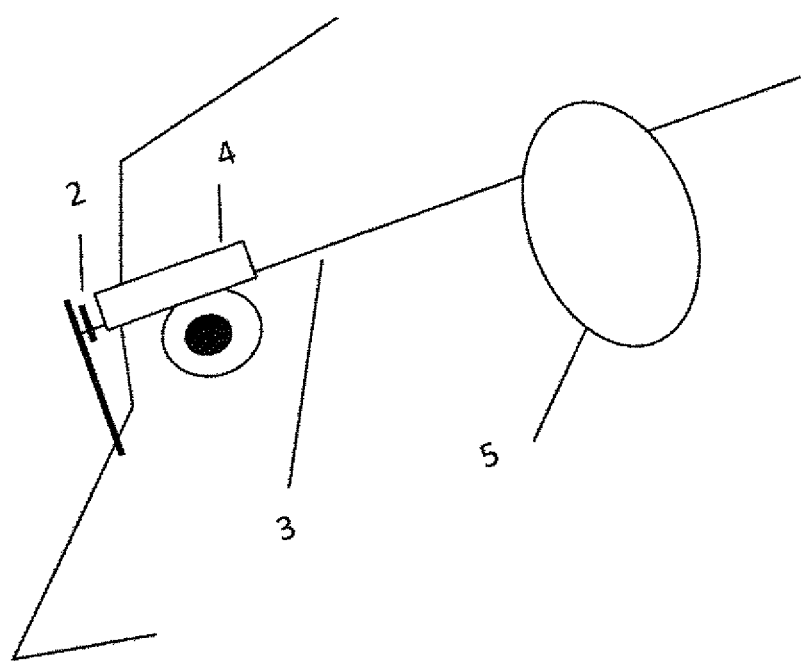
FIG. 2b is a schematic of the smart glasses in a second orientation in accordance with an exemplary embodiment.

FIG. 2a is a schematic of smart glasses 1 in a first orientation, and FIG. 2b is a schematic of the smart glasses 1 in a second orientation. The way the head of the wearer is held in FIG. 2a corresponds to the way the head of a driver is held while a vehicle is being driven when the driver is observing the surroundings of the vehicle. FIG. 2b shows the way the head of the driver is held when he is actuating operating elements in the dashboard of the vehicle. The head is inclined downward. When in operation, the camera 4 regularly takes photographs. Said photographs are processed in an electronic image processing means (not illustrated). An attempt is made in this case to recognize in the photograph structures of the dashboard and the borders of the windows which are known and prestored. When structures of the dashboard and the borders of the windows are recognized, their position in the photograph is determined. The orientation of the smart glasses 1 can be inferred from the position of the recognized structures and borders. Said orientation is now compared with two criteria. In accordance with the first criterion, a check is made as to whether the positions of recognized structures or window borders are within a range of positions, for example in the lower third of the photograph. It is possible to conclude therefrom that the head of the driver is being held relatively horizontally so that the driver can observe the surroundings. The second criterion is an absorption criterion which is always fulfilled when the first criterion is not fulfilled, and so it states definitely that the positions of the recognized structures and window borders are in the upper two thirds of the photograph (that is to say, the negation of all other criteria). When the second criterion is fulfilled, it may be deduced therefrom that the driver has inclined his head in order to view the dashboard. An information source is assigned to each criterion. In the present case, the fulfillment of the first criterion prompts the display of the speed of the vehicle and the time of day, which an onboard computer provides. When the second criterion is fulfilled, the display of the video image of a front camera of the vehicle is prompted. In this way, even when he is viewing the dashboard the driver can at least partially pay heed to the traffic ahead.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining an information source from a plurality of information sources for display on smart glasses comprising a camera, the method comprising the acts of:
   determining a spatial orientation of the smart glasses;
   determining from a plurality of criteria, which are respectively related to the spatial orientation of the smart glasses, a criterion which is fulfilled by the determined spatial orientation of the smart glasses;
   assigning each of the plurality of criteria an information source from the plurality of information sources; and
   selecting the information source assigned to the determined criterion,
   wherein said determining the spatial orientation comprises:
     receiving a photograph from the camera,
     recognizing, in the photograph, an image of a portion of an interior of a vehicle in the photograph,
     determining at least one of a position of the image and a portion of the image in the photograph, and
     determining the spatial orientation of the smart glasses based at least in part on the at least one of the determined position and portion of the image in the photograph.

2. The method as claimed in claim 1, wherein one of the criteria from the plurality of criteria defines an orientation of the smart glasses such that, when the smart glasses are worn by a wearer in a vehicle, the wearer of the spectacles views the surroundings of the vehicle.

3. The method as claimed in claim 1,
   wherein a criterion from the plurality of criteria specifies a range of directions, the method further comprising:
   assigning the smart glasses a direction from the range of directions; and
   determining the direction assigned to the smart glasses based at least in part on the determined spatial orientation of the smart glasses.

4. The method as claimed in claim 2,
   wherein a criterion from the plurality of criteria specifies a range of directions, the method further comprising:
   assigning the smart glasses a direction from the range of directions; and
   determining the direction assigned to the smart glasses based at least in part on the determined spatial orientation of the smart glasses.

5. The method as claimed in claim 1, wherein recognizing the image of the portion of the interior of the vehicle in the photograph comprises:
   recognizing structures in the photograph; and
   comparing the recognized structures in the photograph with stored structures of the interior of the vehicle.

6. The method as claimed in claim 1,
   wherein the smart glasses include position sensors configured to detect a spatial position of the smart glasses,
   wherein said determining the spatial orientation of smart glasses comprising determining the spatial orientation of the smart glasses using the position sensors.

7. The method as claimed in claim 2,
   wherein the smart glasses include position sensors configured to detect a spatial position of the smart glasses,
   wherein said determining the spatial orientation of smart glasses comprising determining the spatial orientation of the smart glasses using the position sensors.

8. The method as claimed in claim 3,
   wherein the smart glasses include position sensors configured to detect a spatial position of the smart glasses, wherein said determining the spatial orientation of smart glasses comprising determining the spatial orientation of the smart glasses using the position sensors.

9. The method as claimed in claim 1, in which the plurality of information sources comprises:
a video camera directed in a direction corresponding to a driving direction of a vehicle, a side of the vehicle, and upward from the vehicle, and
an information processing means configured to output physical measured values of a state of a vehicle, wherein the state of the vehicle corresponds to one of a speed of the vehicle, a rotational speed of a drive of the vehicle, a power output of the drive of the vehicle, and a filling condition of an energy store of the vehicle.

10. The method as claimed in claim 2, in which the plurality of information sources comprises:
a video camera directed in a direction corresponding to a driving direction of a vehicle, a side of the vehicle, and upward from the vehicle, and
an information processing means configured to output physical measured values of a state of a vehicle, wherein the state of the vehicle corresponds to one of a speed of the vehicle, a rotational speed of a drive of the vehicle, a power output of the drive of the vehicle, and a filling condition of an energy store of the vehicle.

11. The method as claimed in claim 3, in which the plurality of information sources comprises:
a video camera directed in a direction corresponding to a driving direction of a vehicle, a side of the vehicle, and upward from the vehicle, and
an information processing means configured to output physical measured values of a state of a vehicle, wherein the state of the vehicle corresponds to one of a speed of the vehicle, a rotational speed of a drive of the vehicle, a power output of the drive of the vehicle, and a filling condition of an energy store of the vehicle.

12. The method as claimed in claim 6, in which the plurality of information sources comprises:
a video camera directed in a direction corresponding to a driving direction of a vehicle, a side of the vehicle, and upward from the vehicle, and
an information processing means configured to output physical measured values of a state of a vehicle, wherein the state of the vehicle corresponds to one of a speed of the vehicle, a rotational speed of a drive of the vehicle, a power output of the drive of the vehicle, and a filling condition of an energy store of the vehicle.

13. The method as claimed in claim 1, wherein the smart glasses provide a display for only one eye of a wearer of the smart glasses, wherein the display of the smart glasses covers less than a third of a visual range of the one eye of the wearer and does not cover a central visual range.

14. A device configured to determine an information source from a plurality of information sources for display on smart glasses, wherein the device comprises:
a camera; and
an electronic processing means,
wherein the electronic processing means is configured:
determine a spatial orientation of the smart glasses,
determine from a plurality of criteria, which are respectively related to the spatial orientation of the smart glasses, a criterion which is fulfilled by the determined spatial orientation of the smart glasses,
assign each of the plurality of criteria an information source from the plurality of information sources, and
select the information source assigned to the determined criterion,
wherein the electronic processing means is configured to determine the spatial orientation of the smart glasses by:
receiving a photograph from the camera,
recognizing, in the photograph, an image of a portion of an interior of a vehicle in the photograph,
determining at least one of a position of the image and a portion of the image in the photograph, and
determining the spatial orientation of the smart glasses based at least in part on the at least one of the determined position and portion of the image in the photograph.

15. A computer program product comprising a non-transitory processor readable medium having processor executable code embodied therein to determine an information source from a plurality of information sources for display on smart glasses having a camera, the non-transitory processor readable medium having:
processor executable program code to determine a spatial orientation of the smart glasses based on:
recognizing, in a photograph received from the camera, an image of a portion of an interior of a vehicle in the photograph,
determining at least one of a position of the image and a portion of the image in the photograph, and
determining the spatial orientation of the smart glasses based at least in part on the at least one of the determined position and portion of the image in the photograph,
processor executable program code to determine from a plurality of criteria, which are respectively related to the spatial orientation of the smart glasses, a criterion which is fulfilled by the determined spatial orientation of the smart glasses,
processor executable program code to assign each of the plurality of criteria an information source from the plurality of information sources, and
processor executable program code to select the information source assigned to the determined criterion.

* * * * *